(12) United States Patent
Kiran et al.

(10) Patent No.: US 8,527,764 B2
(45) Date of Patent: Sep. 3, 2013

(54) METHOD AND SYSTEM FOR SECURE COMMUNICATION

(75) Inventors: Kumar K. Kiran, Seoul (KR); Sung Hyun Cho, Seoul (KR); Min Gyu Chung, Seoul (KR); Koo Yong Pak, Seoul (KR); Il Gon Park, Seoul (KR); Soo Jung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 563 days.

(21) Appl. No.: 12/601,612

(22) PCT Filed: May 7, 2008

(86) PCT No.: PCT/KR2008/002562
§ 371 (c)(1),
(2), (4) Date: May 27, 2010

(87) PCT Pub. No.: WO2008/136639
PCT Pub. Date: Nov. 13, 2008

(65) Prior Publication Data
US 2010/0257363 A1      Oct. 7, 2010

Related U.S. Application Data

(60) Provisional application No. 60/916,341, filed on May 7, 2007, provisional application No. 60/949,722, filed on Jul. 13, 2007, provisional application No. 60/952,418, filed on Jul. 27, 2007, provisional application No. 60/953,834, filed on Aug. 3, 2007, provisional application No. 60/955,125, filed on Aug. 10, 2007, provisional application No. 60/955,642, filed on Aug. 14, 2007.

(51) Int. Cl.
*H04L 9/32* (2006.01)
*H04L 29/06* (2006.01)
*G06F 7/04* (2006.01)

(52) U.S. Cl.
USPC ............... 713/169; 713/156; 726/29; 726/30

(58) Field of Classification Search
USPC ......... 713/150, 155–158, 164–171; 726/2–3, 726/10, 26–30
See application file for complete search history.

(56) References Cited

U.S. PATENT DOCUMENTS 5,949,877 A * 9/1999 Traw et al. .................... 713/171
6,160,903 A   12/2000 Hamid et al.
(Continued)

FOREIGN PATENT DOCUMENTS

EP   1648110 A1   4/2006
EP   1667355      6/2006
(Continued)

OTHER PUBLICATIONS

International Search Report in Application No. PCT/KR2008/004503, mailed Feb. 19, 2009, 2 pages.

(Continued)

*Primary Examiner* — Darren B Schwartz
(74) *Attorney, Agent, or Firm* — Fish & Richardson P.C.

(57) ABSTRACT

A method and system for secure communication is provided. The method for secure communication with devices includes: obtaining a parameter for protecting a content; authenticating each other by exchanging a certificate with the device; and exchanging a key with the device using a key authenticated through the certificate to establish a secure authenticated channel with the device. Accordingly, it is possible to establish the secure authenticated channel and perform secure communication by computing a secure authenticated channel key.

7 Claims, 5 Drawing Sheets

(56) References Cited

U.S. PATENT DOCUMENTS

| | | | |
|---|---|---|---|
| 8,010,786 B1* | 8/2011 | Ward | 713/156 |
| 2002/0157002 A1* | 10/2002 | Messerges et al. | 713/155 |
| 2002/0191764 A1* | 12/2002 | Hori et al. | 379/200 |
| 2003/0016829 A1* | 1/2003 | Chu | 380/281 |
| 2003/0018491 A1* | 1/2003 | Nakahara et al. | 705/1 |
| 2003/0065921 A1* | 4/2003 | Chang | 713/175 |
| 2003/0126086 A1 | 7/2003 | Safadi | |
| 2004/0030656 A1* | 2/2004 | Kambayashi et al. | 705/59 |
| 2004/0102987 A1* | 5/2004 | Takahashi et al. | 705/1 |
| 2004/0103303 A1* | 5/2004 | Yamauchi et al. | 713/200 |
| 2004/0139312 A1 | 7/2004 | Medvinsky | |
| 2004/0158731 A1* | 8/2004 | Narin et al. | 713/200 |
| 2005/0100167 A1 | 5/2005 | Alve et al. | |
| 2005/0120232 A1* | 6/2005 | Hori et al. | 713/193 |
| 2005/0138351 A1* | 6/2005 | Lee et al. | 713/151 |
| 2005/0154921 A1 | 7/2005 | Medvinsky | |
| 2005/0182931 A1 | 8/2005 | Robert et al. | |
| 2005/0216739 A1* | 9/2005 | Lee et al. | 713/168 |
| 2006/0047957 A1 | 3/2006 | Helms et al. | |
| 2006/0093138 A1* | 5/2006 | Durand et al. | 380/44 |
| 2006/0154648 A1* | 7/2006 | Oh et al. | 455/411 |
| 2006/0235798 A1* | 10/2006 | Alkove et al. | 705/59 |
| 2006/0235801 A1* | 10/2006 | Strom et al. | 705/59 |
| 2006/0272004 A1* | 11/2006 | Brockhaus et al. | 726/2 |
| 2007/0079381 A1* | 4/2007 | Hartung et al. | 726/26 |
| 2007/0100701 A1* | 5/2007 | Boccon-Gibod et al. | 705/21 |
| 2007/0172065 A1* | 7/2007 | Lee et al. | 380/259 |
| 2007/0192596 A1 | 8/2007 | Otsuka | |
| 2008/0046758 A1* | 2/2008 | Cha et al. | 713/189 |
| 2008/0256646 A1* | 10/2008 | Strom et al. | 726/29 |
| 2009/0064341 A1* | 3/2009 | Hartung et al. | 726/27 |
| 2009/0178019 A1 | 7/2009 | Bahrs et al. | |
| 2009/0217036 A1* | 8/2009 | Irwin et al. | 713/168 |
| 2009/0300775 A1* | 12/2009 | Chu et al. | 726/27 |

FOREIGN PATENT DOCUMENTS

| | | | |
|---|---|---|---|
| JP | 2002/163396 | | 6/2002 |
| JP | 2003044436 | | 2/2003 |
| JP | 2003143137 | | 5/2003 |
| JP | 2005-523509 | | 8/2005 |
| JP | 2006085479 | | 3/2006 |
| KR | 10-2002095726 | A | 12/2002 |
| KR | 10-2003-075821 | A | 9/2003 |
| KR | 2004028083 | A | 4/2004 |
| KR | 2005070643 | A | 7/2005 |
| WO | WO 03/081499 | | 10/2003 |
| WO | WO 03/090049 | | 10/2003 |
| WO | W02005071519 | A1 | 8/2005 |
| WO | WO 2006/063194 | | 6/2006 |

OTHER PUBLICATIONS

International Search Report and Written Opinion in Application No. PCT/KR2008/002562, mailed May 7, 2008, 6 pages.
International Search Report and Written Opinion in Application No. PCT/KR2008/002301, mailed Apr. 23, 2008, 7 pages.
Korean Office Action dated Jan. 25, 2011 for Application No. 10-2009-7021449, with English translation, 9 pages.
Office Action issued by USPTO on Feb. 3, 2012 for U.S. Appl. No. 12/671,524.
Office Action issued by Japanese Patent Office on Apr. 9, 2012 for corresponding JP Patent Application No. 2010-506046, with English translation; 5 pages.
Office Action issued by the Japanese Patent Office on May 9, 2012 for JP Application No. 2010-520933, with English translation; 18 pages.
Office Action issued by JPO on Dec. 6, 2011 for the corresponding JP Patent Application No. 2010-507321.
Office Action issued by USPTO on Jan. 5, 2012 for the corresponding U.S. Appl. No. 12/624,802.
Extended European Search Report by EPO on Jan. 4, 2012 for the corresponding EP Patent Application No. 08753359.2.
Diffie, W. et al. "Authentication and Authenticated Key Exchanges", Designs, Codes and Cryptography, Kluwer Academic Publishers, Boston, US, vol. 2, No. 2, Jan. 1, 1992, pp. 114-119.
Schneier, B. "Applied Cryptography, Passage", Jan. 1, 1996, Applied Cryptography, Protocols, Algorithms, and Source Code in C, John Wiley & Sons, Inc., New York, pp. 183-184, 513-515, 518-520.
Office Action issued by the USPTO on Aug. 30, 2012 for corresponding U.S. Appl. No. 12/597,252; 9 pages.
Office Action issued on Dec. 13, 2012 for U.S. Appl. No. 12/671,524; 11 pages.
Supplementary Partial European Search Report dated May 31, 2013 from EP Application No. 08741536.0, 9 pages.
Dvb-Digital Video Broadcasting: "Digital Video Broadcasting (DVB); Content Protection & Copy Management", vol. A094. Nov. 1, 2005, 103 pages (XP007901168).

* cited by examiner

METHOD AND SYSTEM FOR SECURE COMMUNICATION

TECHNICAL FIELD

The present invention relates to a method and system for secure communication and, more particularly, to a secure communication method which establishes a secure authenticated channel between devices by exchanging certificates and authenticated keys between the devices.

BACKGROUND ART

Generally, a digital rights management (DRM) is a total digital content protection technique capable of preventing illegal copy and use of a digital resource and allowing only a legally authorized user to use the digital resource. The DRM provides a total protection framework for the overall production and distribution of the digital resource. For example, the digital resource is transformed into encrypted data in a package form using an encryption technique, and the corresponding digital resource cannot be used without a legal authentication process.

Such a DRM becomes the base of a stable and legal resource service as it is connected with various resource service models. In practice, each of the current service providers employs its own DRM to protect the resources that it provides. For example, in case of a sound source service for providing sound sources through on-line, the sound sources that are encrypted as a specific encryption pattern are provided so as to prevent illegal copy. The sound sources are reproducible only by an application provided by the service provider.

However, since the DRM has an exclusive property technically or politically in terms of its characteristics, different DRMs are not compatible with one another. Accordingly, the resource provided by a specific service provider cannot be used with an application provided by another provider, which actually restricts the universal use of the DRM resources, thus resulting in a serious problem that obstructs the development of the legal content market.

Accordingly, various attempts to provide an interoperable framework between the closed DRM structures have been made, and a typical result is a DRM interoperable system. The DRM interoperable system may be a system that mediates between DRMs different from each other so as to exchange and use resources or licenses.

In order to implement the DRM interoperable system, it is necessary to provide a scenario that can define objects of the system and connect the system objects. Especially, in the system where the transfer of the content or license is frequently made like the DRM interoperable system, a high security in communication between devices is required. Accordingly, such systems require procedures and techniques related thereto capable of performing authentication and secure communication between the devices.

DISCLOSURE OF INVENTION

Technical Problem

The present invention provides a method and system for secure communication which performs mutual authentication using a predetermined protocol between devices and performs secure communication based on the authentication.

Technical Solution

According to an aspect of the present invention, there is provided a secure communication method between devices, the method comprising: obtaining a parameter for protecting a content; authenticating each other by exchanging a certificate with the device; and exchanging a key with the device using a key authenticated through the certificate to establish a secure authenticated channel with the device.

The secure communication method may further comprise varying a content license protection mode of the content when the content is copied or moved from the device.

The process of exchanging the key with the device may further comprise computing a key value required to compute a secure authenticated channel key to be used in the secure authenticated channel and transferring and receiving the key value to and from the device. In this case, the secure communication method may further comprise computing the secure authenticated channel key using the key value.

The process of transferring and receiving the key value may comprise: transferring a specific computed value together with the certificate to the device; performing, at the device, validity verification using the certificate and receiving a hash value computed according to a predetermined algorithm and the certificate of the device from the device; and performing validity verification using the certificate of the device and transferring a hash value computed according to a predetermined algorithm to the device.

The key may be at least one of a public key value and a hash value, computed according to a predetermined algorithm.

According to another aspect of the present invention, there is provided a secure communication system. The secure communication system may comprise a first device and a second device which are interoperable with each other. The first device and the second device may authenticate each other using certificates and exchange keys authenticated by the certificates to establish a secure authenticated channel between the first device and the second device.

The first device and the second device may compute key values required to compute a secure authenticated channel key to be used in the secure authenticated channel and exchange the key values with each other.

The first device may transfer a specific computed value together with the certificate of the first device to the second device, the second device may perform validity verification using the certificate of the first device, compute a hash value according to a predetermined algorithm, and transmit the computed hash value together with the certificate of the second device to the first device, and the first device may perform validity verification using the certificate of the second device, compute a hash value according to a predetermined algorithm, and transfer the computed hash vale to the second device.

Moreover, at least one of the first device and the second device may request validity verification of the certificate to an external specific object, e.g., an on-line certificate status protocol (OCSP) server, during authentication.

Advantageous Effects

According to the present invention, it is possible to perform authentication by exchanging certificates between devices and compute a secure authenticated channel key by exchanging key values required to compute the secure authenticated channel key. Accordingly, it is possible to establish a secure authenticated channel and perform secure communication.

REFERENCE NUMERALS

10: device A (DeviceA)
20: device B (DeviceB)
30: on-line certificate status protocol (OCSP) server

MODE FOR THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments. In the following detailed description of the preferred embodiments of the present invention, specific terminology is used for the sake of clarity. However, the terminology chosen is general, and includes all technical equivalents accomplishing a substantially similar purpose by operating in a substantially similar manner.

Figure 1:
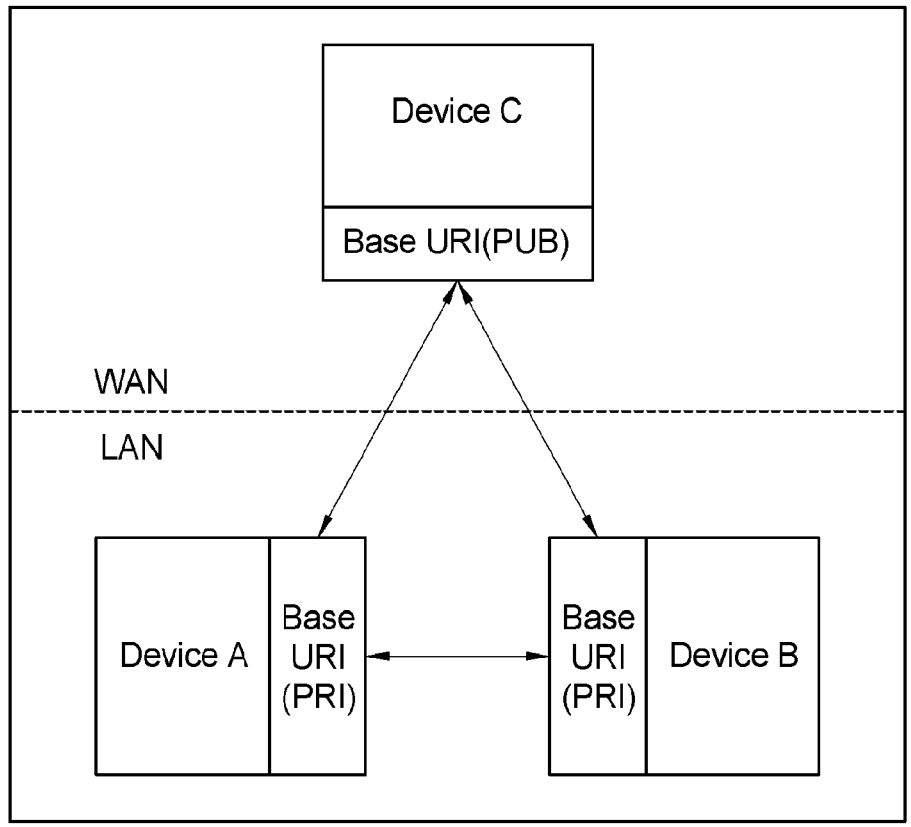
FIG. 1 is a block diagram showing a configuration of a system capable of performing a handshaking method for secure communication in accordance with a preferred embodiment of the present invention.

FIG. 1 is a block diagram showing a configuration of a system capable of performing a handshaking method for secure communication in accordance with a preferred embodiment of the present invention.

Referring to FIG. 1, a device may use a base universal resource identifier (URI) capable of uniquely identifying another device for communication with the device.

The base URI may be a private IP address (PRI) or a public IP address (PUB). Preferably, in case of a wide area network (WAN), the public IP address (PUB) may be used as the base URI, and in case of a local area network (LAN), the private IP address (PRI) or the public IP address (PUB) may be used as the base URI.

For example, as shown in FIG. 1, device C (e.g., a service provider) at an end of the WAN may use the public IP address (PUB) as the base URI, and device A and device B at an end of the LAN (e.g., clients) may use the private IP address (PRI) and the public IP address (PUB), respectively, as the base URI.

Device A and device B may be devices registered in a domain. The domain is a basic unit of a DRM trust framework and may represent a set of authorized devices. The domain devices registered in the domain may share and use a content based on authorized rights. In order to transmit the content between the domain devices, it is necessary to perform secure communication after establishing a secure authenticated channel. The domain device may include a module for managing the interaction with the domain and a module for handling the content and license. The domain device can obtain, process, use, store, and transmit the content using such modules.

The domain may be configured in consideration of a physical position of the device. That is, the domain is configured with devices located in a specific physical area. A local environment is required to construct the domain. In this case, the local environment may represent an environment in which a physical network is prepared so that devices in a specific local area are interactive with one another, and in which the physical network is interactive with an external network. As an example for providing the local environment, there is a home network system.

Meanwhile, the base URI may be expressed as a uniform resource locator in the form of a character string by a domain name service. Such a base URI is a unique identifier capable of identifying the corresponding device. The devices may communicate with each other based on hypertext transport protocol (HTTP) using the base URI.

Next, a secure communication procedure capable of securely providing a content service through the secure authenticated channel will be described in detail.

Figure 2:
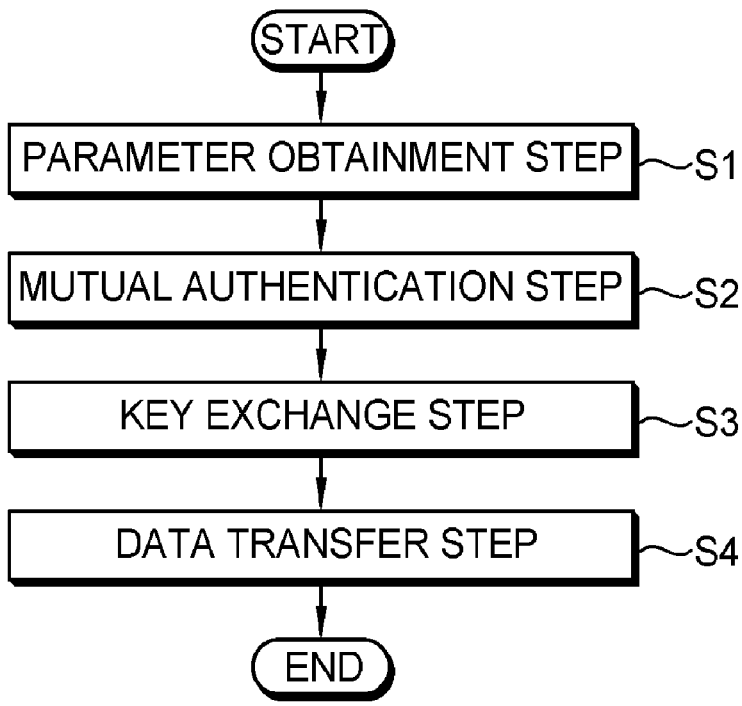
FIG. 2 is a flowchart illustrating a secure communication method in accordance with another preferred embodiment of the present invention.

FIG. 2 is a flowchart illustrating a secure communication method in accordance with another preferred embodiment of the present invention, in which the processes of performing the secure communication between device A and device C through the secure authenticated channel is generally shown.

Device A may represent a device that receives a service, i.e., a client. For example, device A may request and receive a content and a content license thereof from device B. Device B may be a device that provides a service, i.e., a service provider that provides services, or another client device in the domain. Device A and device B may mutually authenticate for the service, establish the secure authenticated channel, and then transmit data through the secure authenticated channel.

As shown in FIG. 2, the secure communication method in accordance with the preferred embodiment of the present invention may include a parameter obtainment step (S1), a mutual authentication step (S2), a key exchange step (S3), and a data transfer step (S4).

In the parameter obtainment step (S1), device A may invoke device B using the base URI of device B to receive and obtain parameters required for the secure communication, such as a parameter for authentication, a parameter for protecting the content, and a service parameter.

In the authentication step (S2), device A and device B may perform mutual authentication to ensure the secure communication. During mutual authentication, device A and device B receive a certificate of device B and that of device A, respectively to verify the validity. During verification of the certificate validity, device A or device B may be connected with an on-line certificate status protocol (OCSP) server.

In the key exchange step (S3), to establish the secure authenticated channel between device A and device B, device A and device B may compute key values required to compute a secure authenticated channel key to be used in the secure authenticated channel, and transmit and receive the key values to and from each other. The key values may be those authenticated through the certificates. When the key values are confirmed by the devices, the secure authenticated channel is established. As a result, data can be transmitted through the secure authenticated channel.

In the data transfer step (S4), device A and device B may transmit and receive data related to the corresponding service through the secure authenticated channel according to the service parameter. For example, a content or a license of the content may be transmitted from device B to device A, or messages related to the service may be transmitted from device A to device B. During the transfer of the content, specific information of the content license such as a license protection mode may be varied.

Next, the above-described steps (S1 to S4) will be described in more detail.

Figure 3:
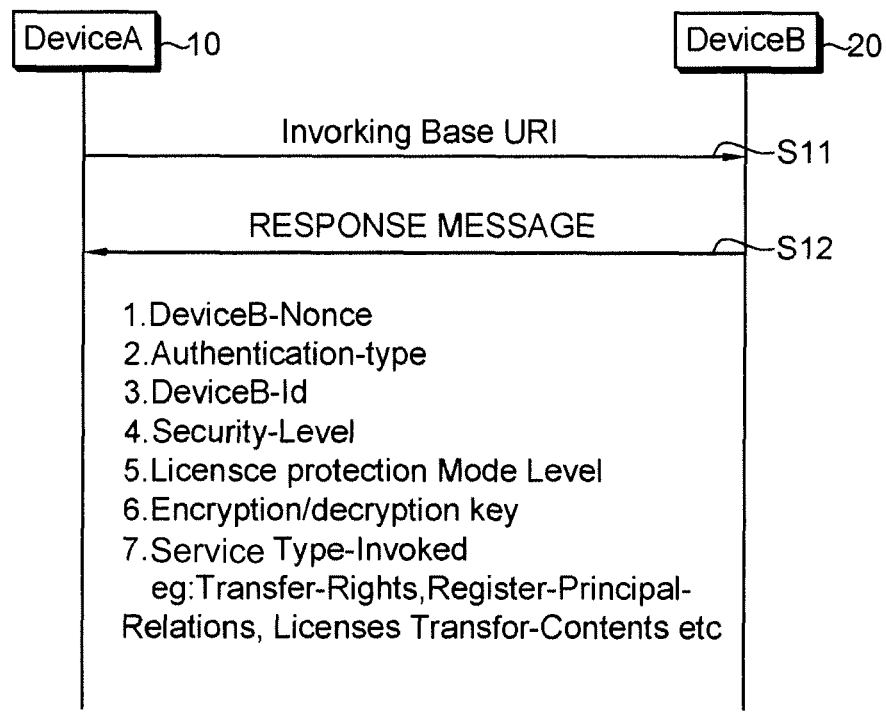
FIG. 3 is a flowchart illustrating a detailed procedure and a protocol structure of a parameter obtainment step shown in FIG. 2.

FIG. 3 is a flowchart illustrating a detailed procedure and a protocol structure of the parameter obtainment step (S1) shown in FIG. 2.

As shown in FIG. 3, device A 10 may invoke device B 20 to obtain a parameter (S11). At this time, device A 10 may use the base URI of device B 20 to invoke device B 20. For example, device A 10 may transmit an HTTP message to access the URL of device B 20 to device B 20, or transmit a message to access the private IP address (PRI) of device B 20 to device B 20.

Subsequently, device B 20 transmits parameters required for the secure communication to device A 10. Then, device A 10 can obtain the parameters related to authentication, security, and services for the secure communication (S12).

In this case, the parameters may include a device nonce of device B 20 (DeviceB-Nonce), an authentication type, a device ID of device B 20 (DeviceB-ID), a security level, a license protection mode level, an encryption/decryption key for the content protection, and an invoked service type (Service Type-Invoked).

The device nonce of device B 20 (DeviceB-Nonce) may represent a value that device B 20 uses to authenticate device A 10. The device nonce of device B 20 may be a random value generated by a pseudo random generator in device B 20. The device nonce of device B 20 may be included in the message transmitted from device A 10 to device B 20 so that device B 20 uses the device nonce to authenticate device A 10.

The authentication type may include information for designating which authentication type is performed during mutual authentication. For example, the authentication type may designate whether the verification of the certificate validity in connection with an on-line certificate status protocol (OCSP) server 30 is performed by device A 10 and device B 20, respectively, or by device B 20 only.

The device ID of device B 20 (DeviceB-ID) may represent a parameter for identifying device B 20. The device ID of device B 20 may be URL, PRI, PUB, physical information, or logical information for uniquely identifying device B 20.

The security level may represent a parameter for setting a level related to integrity and confidentiality during secure communication between device A 10 and device B 20. For example, the security level may set whether it provides either or both of the integrity and the confidentiality in the secure communication between device A 10 and device B 20.

The license protection mode level may be a parameter for designating a level of the license protection mode that the secure communication between device A 10 and device B 20 have. In this case, the license protection mode may represent a protection mode required to protect the content license. The license protection mode is given to the content license according to information included in the corresponding license. The device may consider the license protection mode of the corresponding license when transmitting the license. The license protection mode will be described in detail later.

The encryption/decryption key may represent a parameter for encrypting or decrypting the content for the content protection. For example, the encryption/decryption key may be a content encryption/decryption key of a predetermined bit for AES block cipher.

The invoked service type may represent a parameter for indicating the type of the invoked service. For example, the invoked service type may be a transfer license, a transfer content, register principal relations, and the like.

Figure 4:
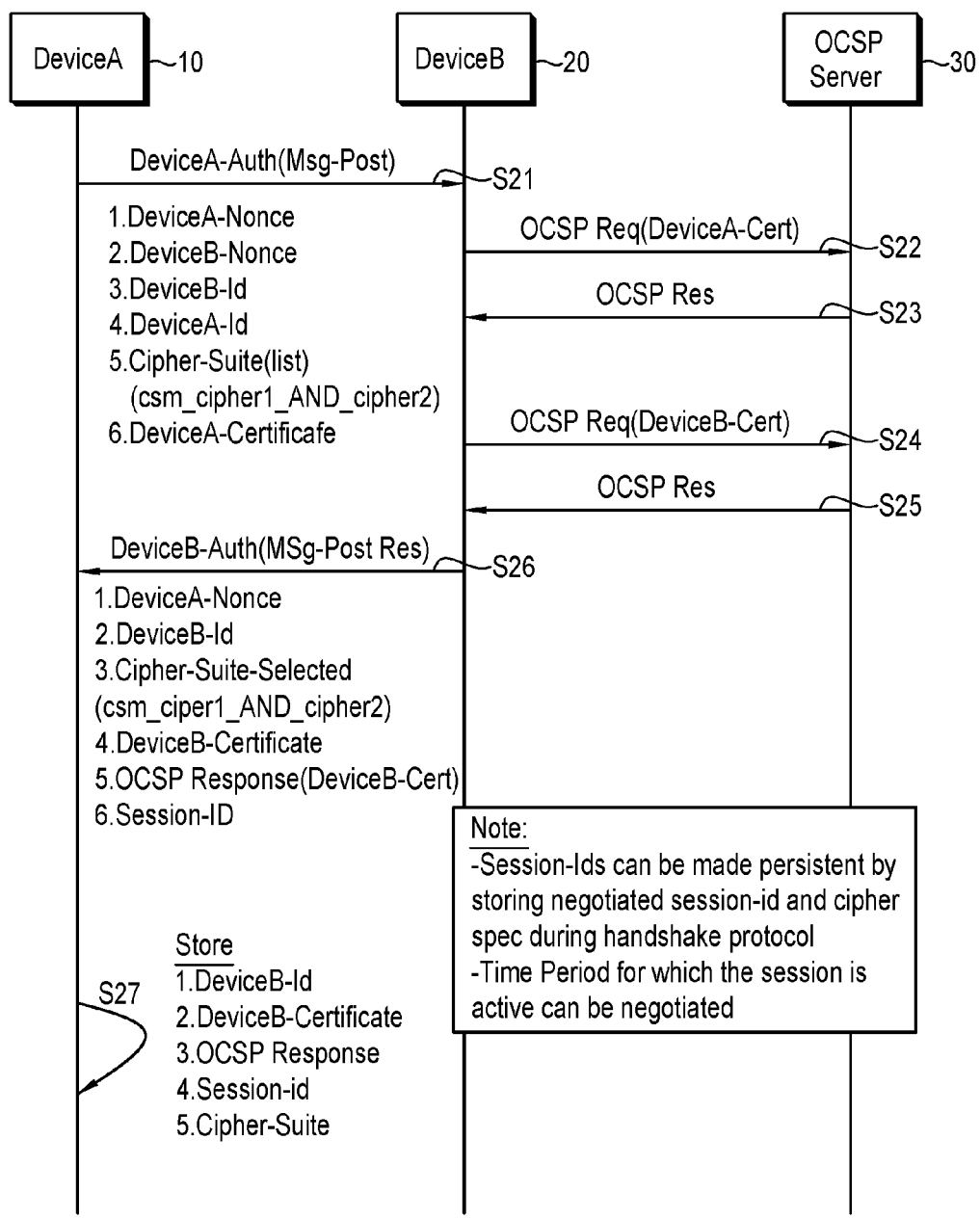
FIG. 4 is a flowchart illustrating a detailed procedure and a protocol structure of a mutual authentication step shown in FIG. 2.

FIG. 4 is a flowchart illustrating a detailed procedure and a protocol structure of the mutual authentication step (S2) shown in FIG. 2.

Referring to FIG. 4, device A 10 and device B 20 may have a random private key, a certificate, and a public key, respectively, for the mutual authentication. When the procedure is initiated, device A 10 may transmit an authentication message of device A 10 for requesting the authentication of device A 10 to device B 20.

In this case, the authentication message of device A 10 may include a device nonce of device A 10 (DeviceA-Nonce), a device nonce of device B 20 (DeviceB-Nonce), a device ID of device B 20 (DeviceB-ID), a device ID of device A 10 (DeviceA-ID), a cipher suite list (Cipher-Suite-List), and a certificate of device A 10 (DeviceA-Certificate).

The device nonce of device A 10 (DeviceA-Nonce) may represent a value that device A 10 uses to authenticate device B 20. The device nonce of device A 10 may be a random value generated by a pseudo random generator in device A 10. The device nonce of device A 10 may be included in the message transmitted from device B 20 to device A 10 so that device A 10 uses the device nonce to authenticate device B 20.

The device nonce of device B 20 (DeviceB-Nonce) is a random value generated and provided by device B 20 as mentioned above, and device B 20 that receives the authentication message of device A 10 uses the device nonce of device B 20 to confirm that the authentication message of device A 10 is transmitted from device A 10.

The device ID of device B 20 (DeviceB-ID) and the device ID of device A 10 (DeviceA-ID) may represent information for identifying device B 20 and device A 10, respectively. The device ID of device B 20 and the device ID of device A 10 may be URL, PRI, PUB, physical information, or logical information for uniquely identifying device B 20 and device A 10, respectively.

The cipher suite list (Cipher-Suite-List) may represent a list of cipher suites that device A 10 can supply. Device B 20 may select a specific cipher suite from the cipher suite list of the authentication message of device A 10 and inform device A 10 of the selected cipher suite. The selected cipher suite may be applied to data encryption in the secure authenticated channel.

The certificate of device A 10 may represent information for authenticating device A 10. The certificate of device A 10 may include certificate identification information, device A identification information, service policy information, revocation information, content handling capability information, local scrambling algorithm (LSA) information, domain-related information, and the like.

When receiving the authentication message of device A 10, device B 20 may authenticate device A 10 based on information contained in the authentication message of device A 10. During the authentication, device B 20 may request the verification of the certificate validity of device A 10 to the OCSP server 30 (S22) and, then, receive a response from the OCSP server 30 (S23). For example, device B 20 may transmit the certificate of device A 10 to the OCSP server 30. Then, the OCSP server 30 may verify whether the certificate of device A 10 received from device B 20 is valid or not, i.e., whether the certificate is revoked or not, and transmit a verification result included in an OCSP response message to device B 20.

Then, device A 10 can confirm whether the certificate of device B 20 is valid or not based on the received OCSP response message.

Moreover, device B 20 may request the verification of the certificate validity of device B 20 to the OCSP server 30 (S24) and receive a response from the OCSP server 30 (S25). For example, device B 20 may transmit the certificate of device B 20 to the OCSP server 30. Then, the OCSP server 30 may verify whether the certificate of device B 20 received from device B 20 is valid or not, i.e., whether the certificate is revoked or not, and transmit a verification result included in an OCSP response message to device B 20. If the certificate of device B 20 is valid, device B 20 may transmit information on the verified certificate of device B 20 and the OCSP response message to device A 10. In this case, device A 10 may confirm whether the certificate of device B 20 is valid or not based on the information on the OCSP response message without connection to the OCSP server 30. Meanwhile, device B 20 may transmit the certificate of device B 20 to device A 10 without verification of the certificate of device B 20 connected to the OCSP server 30. In this case, device A 10 may access the OCSP server 30 to request the verification of the certificate validity of device B 20 and receive a verification result, thus verifying whether the certificate of device B 20 is valid.

After the authentication of device A 10, device B 20 may transmit an authentication message for requesting verification of device B 20 to device A 10 (S26).

In this case, the authentication message of device B 20 may include the device nonce of device A 10 (DeviceA-Nonce), the device ID of device B 20 (DeviceB-ID), the selected cipher suite (Cipher-Suite-Selected), the certificate of device B 20 (DeviceB-certificate), the OCSP response, a session ID (Session-ID), and the like.

The device nonce of device A 10 (DeviceA-Nonce) is a random value generated and provided by device A 10 as mentioned above, and device A 10 that receives the authentication message of device B 20 may authenticate device B 20 using the device nonce of device A 10. For example, device A 10 may confirm that the authentication message of device B 20 is transmitted from device B 20 using the device nonce of device A 10.

The device ID of device B 20 (DeviceB-ID) may be information capable of uniquely identifying device B 20 such as URL, PRI, PUB, physical information, or logical information.

The selected cipher suite (Cipher-Suite-Selected) may represent information on the cipher suite selected by device B 20 from the cipher suite list provided by device A 10. In this case, the selected cipher suite may be applied to data encryption in the secure authenticated channel. The selected cipher suite may be a symmetric cipher suite negotiated between device A 10 and device B 20.

The certificate of device B 20 may represent information for authentication of device B 20. The certificate of device B 20 may include certificate identification information, device B identification information, service policy information, revocation information, content handling capability information, local scrambling algorithm (LSA) information, domain-related information, and the like.

The OCSP response may be information on the OSCP response message that device B 20 has received from the OCSP server 30 and may include information for verification of certificate of device B 20. Device A 10 may confirm whether the certificate of device B 20 is valid based on the OCSP response during the authentication of device B 20. If the OCSP response is not included in the authentication request message of device B 20, device A 10 may access the OCSP server 30 to request the verification of the certificate validity of device B 20 and receive a verification result.

The session ID may represent identification information for identification of the corresponding session. The session IDs may be made persistent by storing the negotiated session ID and cipher spec. during handshake protocol.

After the authentication of device B 20, device A 10 stores the authentication-related information, i.e., information received through the authentication request message of device B 20 (S27). For example, device B 20 may store the device ID of device B 20 (DeviceB-ID), the certificate of device B 20 (DeviceB-Certificate), the OCSP response, the session ID, and the selected cipher suite. Meanwhile, although the mutual authentication between the devices may be performed in the above-described manner, it may be performed in the key exchange step according to the embodiments.

Figure 5:
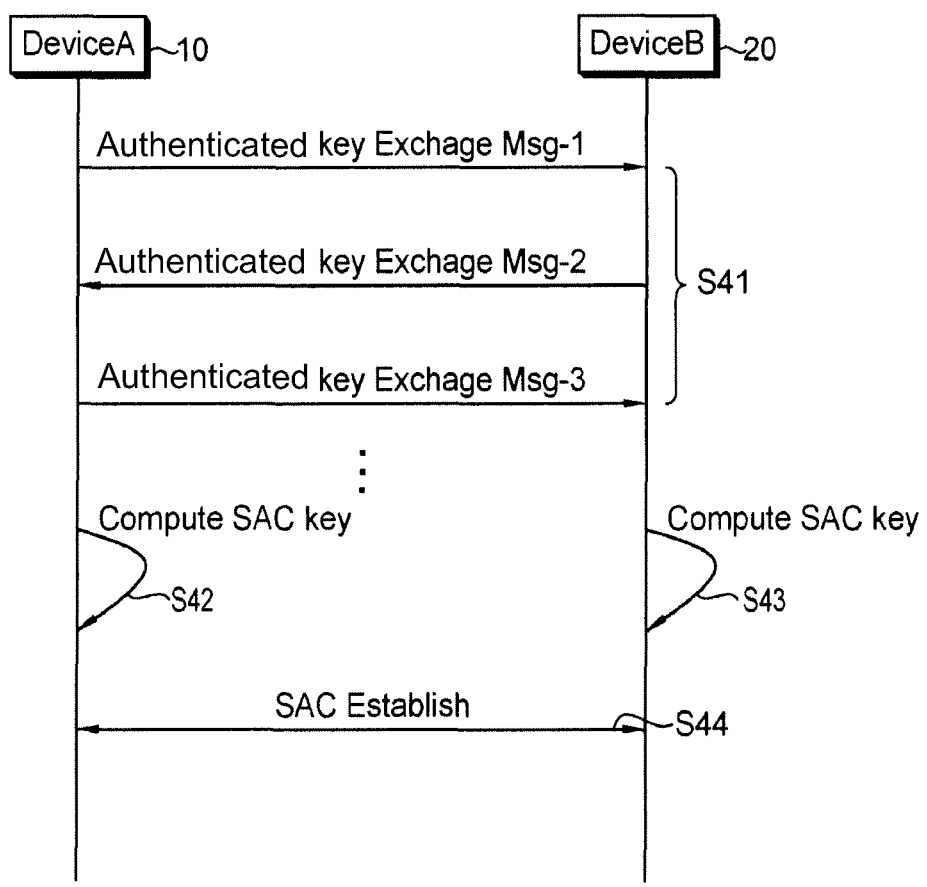
FIG. 5 is a flowchart illustrating a detailed procedure and a protocol structure of a key exchange step shown in FIG. 2.

FIG. 5 is a flowchart illustrating a detailed procedure and a protocol structure of the key exchange step shown in FIG. 2.

Referring to FIG. 5, device A 10 and device B 20 may compute key values required to compute a secure authenticated channel key to be used in the secure authenticated channel, and transmit and receive the key values to and from each other (S41). The key values may be those authenticated through the certificates. Moreover, in the key exchange step, the mutual authentication through the certificate exchange of device A 10 and device B 20 may be performed as well as the computation of the key values.

For example, device A 10 may generate a random value, compute a public key value in connection with the generated random value, and transfer the public key value included in the message together with the certificate of device A 10 to device B 20. Device B 20 that has received the message may extract the public key value and authentication information of device A 10, verify the validity thereof, and compute a secret key value according to a predetermined algorithm. Subsequently, device B 20 may generate a random value, compute a public key value in connection with the generated random value, compute a concatenation of hash value such as the public key value, the secret key value, and the authentication information of device B 20, and transmit the computed hash value included in the message together with the certificate of device B 20 to device A 10. Device A 10 may extract the public key value and authentication information of device B 20 from the received message, verify the validity thereof, and compute a secret key value based on a predetermined algorithm. Subsequently, device A 10 may checks whether the hash value is correct, compute a concatenation of hash value such as the public key value, the secret key value, and the authentication information of device A 10, and transmit the computed hash value to device B 20. Then, device B 20 may verify whether the hash value is correct.

Subsequently, device A 10 and device B 20 may compute a key to be used in the secure authenticated channel, i.e., a secure authenticated channel key, using the computed key values (S42 and S43). The secure authenticated channel key may be a symmetric key, in which the encryption key and the decryption key are the same, and include an encryption authentication session key, a secure authenticated channel authentication session key, and the like. After the computation of the secure authenticated channel key is completed, device A 10 and device B 20 may exchange the secure authenticated channel keys or digital signatures using the secure authenticated channel keys with each other.

After completion of the key exchange step, the secure authenticated channel between device A 10 and device B 20 is established (S44). Then, the data transfer step may be performed. That is, data can be transmitted in the established secure authenticated channel. For example, device A 10 may receive a content or a license of the content from device B 20 through the secure authenticated channel.

The license of the content may include license identification information, license provider information, compliance/robustness (C/R) regime information, revocation information, authorized domain identification information, descrambling information, usage state information, and the like.

A license protection mode is given to the license. The license protection mode may represent a protection condition required to protect the corresponding license. Information on the license protection mode may be included in a specific field in the license or stored and managed in the device.

The license protection mode may include a secure authenticated channel protection mode, an authorized domain secret protection mode, a secure authenticated channel protection/authorized domain secret protection mode, a device key protection mode, and the like.

The secure authenticated channel protection mode may represent a mode in which the license is protected through the secure authenticated channel during transfer of the license. That is, the secure authenticated channel protection mode may represent a mode in which the license is protected using the secured authenticated channel key. On the contrary, the authorized domain secret protection mode may represent a mode in which the license is protected using authorized domain secret protection. Meanwhile, the secure authenticated channel protection/authorized domain secret protection mode may represent a mode in which the license is protected through the secure authenticated channel and authorized domain secret protection. The device key protection mode may represent a mode in which the license is protected with a device key during storage of the license.

The above-described license protection modes may be set according to the usage state information included in the license. During the transfer of the license, the device may perform the transfer in consideration of the license protection mode of the corresponding license. For example, if the license protection mode of the license that the device wants to transmit or receive is the secure authenticated channel protection mode, the device may transmit or receive the license through the secure authenticated channel. In this case, it is possible to confirm whether the level of the license protection mode of the parameter transmitted or obtained in the parameter obtainment step corresponds to the license protection mode that the license requires.

Meanwhile, if the content is transmitted from a specific device to another device (e.g., copied or moved), the license protection mode of the license of the corresponding content may vary.

The domain can share the same kind of DRM content and license, and the domain of the DRM interoperable system can share different kinds of DRM content and license. In the DRM interoperable system, a license token is used for compatibility of the license. The license token may be information having a predetermined format capable of extracting compliant and diversified DRM license information and may represent a kind of neutral license.

Rights to use the content with a native DRM (e.g., an OMA DRM), that is, a process of transferring the license, in the DRM interoperable system will be described below.

Figure 6:
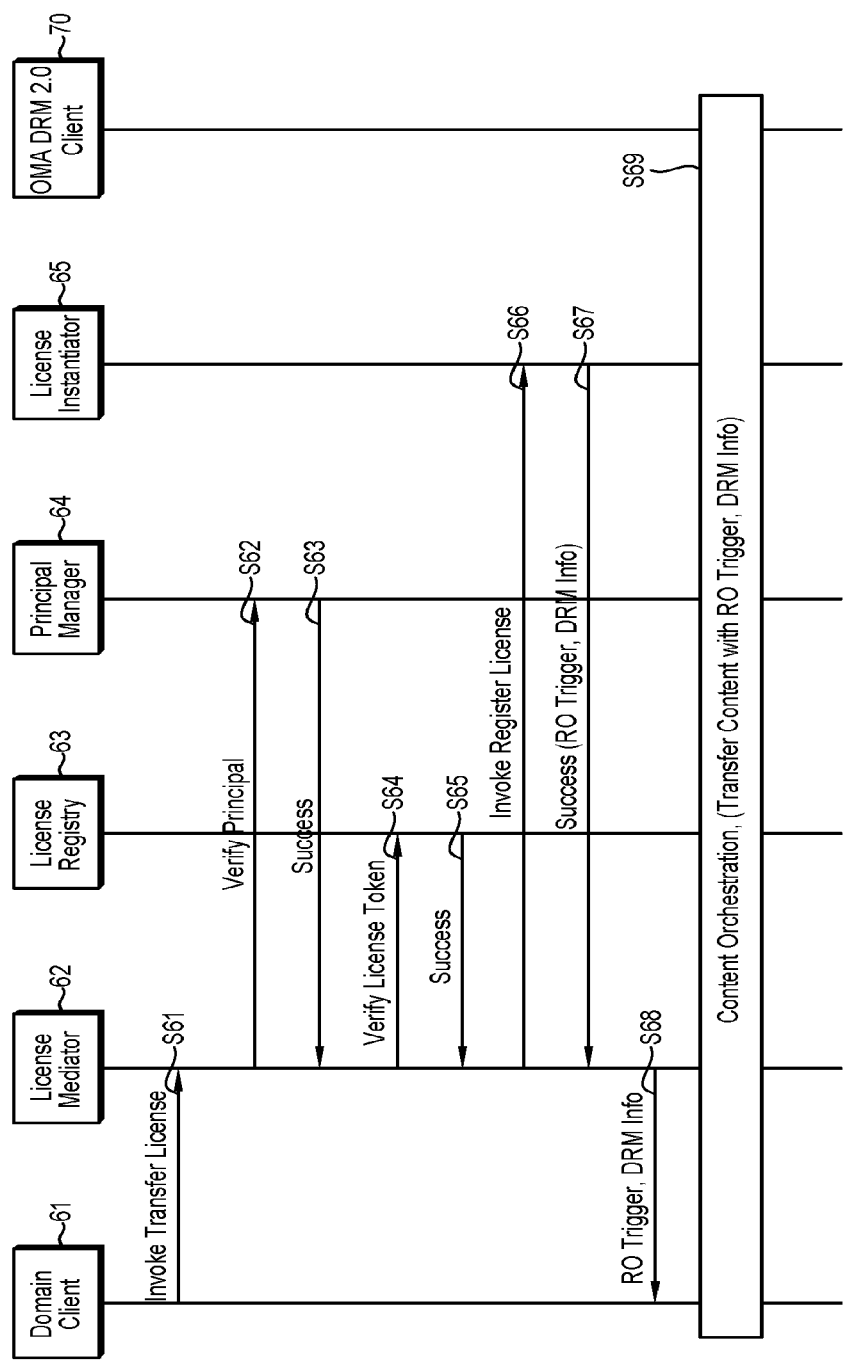
FIG. 6 is a flowchart illustrating a process of transferring a license from a DRM interoperable system to an OMA DRM system.

FIG. 6 is a flowchart illustrating the process of transferring the license from the DRM interoperable system to an OMA DRM system, in which an example of providing a license of the OMA DRM to an OMA DRM client using the license token commonly used in the DRM interoperable system is shown.

As shown in FIG. 6, a domain client 61 of the DRM interoperable system invokes a transfer license interface to request a license mediator 62 to transfer a license of the content to an OMA DRM client 70 (S61). At this time, the domain client 61 may provide a content identifier and a license token of the content to the license mediator 62.

The license mediator 62 that has received the transfer license request verifies whether the transfer license request is valid (S62 to S65). For example, the license mediator 62 may request a principal manager 64 to verify whether the client is an authorized client through interface invocation (S62) and receive a response (S63). Moreover, the license mediator 62 may request a license registry 63 to verify whether the license token is a valid one that the domain client 61 owns at present (S64) and receive a response (S65).

As a result of the validity verification, if it is a valid request, the license mediator 62 may provides information required to register the license and used in the OMA DRM client 70, such as client information and license token, to a license instantiator 65 and request the registration of the license (S66).

The license instantiator 65 may verify the validity of the information provided from the license mediator 62, e.g., the license token, and request a license issuer (not shown) of the OMA DRM to translate the license. Then, the license issuer of the OMA DRM may translate the license token into a license that coincides with an OMA DRM rights object (RO). Subsequently, the license instantiator 65 may receive an OMA DRM RO trigger and other information in a DRM information element from the license issuer of the OMA DRM and transfer the same to the license mediator 62 (S67). The license mediator 62 may receive the information transferred from the license instantiator 65 and transfer the same to the domain client 61 (S68).

Next, a license mediation process is performed by control of the license mediator 62 (S69). During the license mediation process, the current information in the DRM information element may be transferred to the OMA DRM client 70. A content importer (not shown) may use the current information in the DRM information element for packaging of the content during the license mediation process. In this case, the content importer is an object that performs a function of introducing the corresponding content into the OMA DRM client 70.

If the current RO trigger is included in the DRM information element, the domain client 61 passes the RO trigger to the OMA DRM client 70. The OMA DRM client 70 may use the RO trigger to start license download. Contrarily, if the current RO trigger is not included in the DRM information element, the OMA DRM client 70 may use a license issuer URL in the OMA DRM content to start the license download.

Although the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A secure communication method between devices, the method comprising:
   obtaining, by a first device from a second device, a parameter for protecting a content;
   performing, based on the obtained parameter, a mutual authentication with the second device which includes:
      transmitting a first authentication message including a certificate of the first device to the second device;

receiving a second authentication message including a certificate of the second device and an on-line certificate status protocol server response indicating verification of the certificate of the second device, and verifying the certificate of the second device using the on-line certificate status protocol server response;

authenticating the second device using the certificate of the second device;

exchanging a key with the second device, the key authenticated through the certificate of the second device to establish a secure authenticated channel with the second device; and changing a content license protection mode corresponding to the content from a first content license protection mode to a second content license protection mode when the content is copied or moved from the second device;

wherein the content license protection mode includes any one of: a secure authenticated channel protection mode which protects the license using a secure authenticated channel key during transfer of the license, an authorized domain secret protection mode which protects the license using an authorized domain secret protection, a secure authenticated channel/authorized domain protection mode which protects the license through the secure authenticated channel and authorized domain secret protection, and a device key protection mode which protects the license using a device key during storage of the license.

2. The method of claim 1, wherein exchanging the key with the device comprises computing a key value required to compute the secure authenticated channel key to be used in the secure authenticated channel, and transferring and receiving the key value to and from the device, respectively.

3. The method of claim 2, wherein the parameter includes at least one of: identification information of the second device, type of an authentication, a security level for setting a level related to integrity and confidentiality during secure communication between the first device and the second device, and a license protection mode level required for the secure communication between the first device and the second device.

4. The method of claim 1, wherein the license protection mode is set according to usage state information included in the license of the content, and the method further comprises:
confirming whether a license protection mode level of the parameter corresponds to the license protection mode included in the license of the content.

5. A secure communication system comprising:
a first device; and
a second device, which are interoperable with each other, wherein the first device is configured to:
obtain from the second device a parameter for protecting a content,
perform, based on the obtained parameter, a mutual authentication with the second device by:
transmitting a first authentication message including a certificate of the first device to the second device,
receiving a second authentication message including a certificate of the second device and an on-line certificate status protocol server response indicating verification of the certificate of the second device, and
verify the certificate of the second device using the on-line certificate status protocol server response,
authenticate the second device using the certificate of the second device,
exchange a key with the second device, the key authenticated by the certificate of the second device to establish a secure authenticated channel between the first device and the second device, and
change a content license protection mode corresponding to the content from a first content license protection mode to a second content license protection mode when the content is copied or moved between the first device and the second device,
wherein the content license protection mode includes any one of: a secure authenticated channel protection mode which protects the license using a secure authenticated channel key during transfer of the license, an authorized domain secret protection mode which protects the license using an authorized domain secret protection, a secure authenticated channel/authorized domain protection mode which protects the license through the secure authenticated channel and authorized domain secret protection, and a device key protection mode which protects the license using a device key during storage of the license.

6. The system of claim 5, wherein the first device and the second device compute key values required to compute the secure authenticated channel key to be used in the secure authenticated channel and exchange the key values with each other.

7. The system of claim 5, wherein the parameter includes at least one of: identification information of the second device, type of an authentication, a security level for setting a level related to integrity and confidentiality during secure communication between the first device and the second device, and a license protection mode level required for the secure communication between the first device and the second device.

* * * * *